United States Patent
Tan et al.

(10) Patent No.: US 10,606,654 B2
(45) Date of Patent: Mar. 31, 2020

(54) DATA PROCESSING METHOD AND APPARATUS

(71) Applicant: Huawei Technologies Co., Ltd., Shenzhen (CN)

(72) Inventors: Weiguo Tan, Shenzhen (CN); Gang Shao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 58 days.

(21) Appl. No.: 15/728,879

(22) Filed: Oct. 10, 2017

(65) Prior Publication Data

US 2018/0032375 A1 Feb. 1, 2018

Related U.S. Application Data

(63) Continuation of application No. PCT/CN2016/077379, filed on Mar. 25, 2016.

(30) Foreign Application Priority Data

Apr. 29, 2015 (CN) .......................... 2015 1 0212439

(51) Int. Cl.
*G06F 9/50* (2006.01)
*G06F 9/48* (2006.01)

(52) U.S. Cl.
CPC .............. *G06F 9/5044* (2013.01); *G06F 9/48* (2013.01); *G06F 9/5055* (2013.01);
(Continued)

(58) Field of Classification Search
CPC .... G06F 9/5044; G06F 9/5072; G06F 9/5066; G06F 9/5055; G06F 9/48; G06F 2209/501
See application file for complete search history.

(56) References Cited

U.S. PATENT DOCUMENTS

| | | |
|---|---|---|
| 2014/0201744 A1 | 7/2014 | Chu et al. |
| 2014/0229221 A1 | 8/2014 | Shih et al. |

(Continued)

FOREIGN PATENT DOCUMENTS

| | | |
|---|---|---|
| CN | 103488775 A | 1/2014 |
| CN | 104361091 A | 2/2015 |

(Continued)

OTHER PUBLICATIONS

Gu et al., "Memory or Time: Performance Evaluation for Iterative Operation on Hadoop and Spark" (Year: 2013).*

(Continued)

*Primary Examiner* — Sisley N Kim
(74) *Attorney, Agent, or Firm* — Conley Rose, P.C.

(57) ABSTRACT

A data processing method and apparatus are disclosed. The method is determining candidate computing frameworks for each sub-task in a sub-task set; predicating operation time and resource consumption that correspond to each candidate computing framework when the candidate computing framework executes the sub-task; and selecting, in the candidate computing frameworks according to the predicated operation time and resource consumption that correspond to each candidate computing framework when the candidate computing framework executes the sub-task, a target computing framework executing the sub-task (204), and executing the sub-task (205). In this way, a resource management system selects a target computing framework from multiple computing frameworks according to operation time and resource consumption, to execute each sub-task, so as to improve the data processing efficiency and working performance of the system.

18 Claims, 3 Drawing Sheets

(52) U.S. Cl.
CPC .......... *G06F 9/5066* (2013.01); *G06F 9/5072* (2013.01); *G06F 2209/501* (2013.01)

(56) References Cited

U.S. PATENT DOCUMENTS

| | | | |
|---|---|---|---|
| 2015/0066646 | A1 | 3/2015 | Sriharsha et al. |
| 2016/0098662 | A1* | 4/2016 | Voss .................. G06Q 10/06316 705/7.26 |
| 2016/0300157 | A1* | 10/2016 | Sankaradas ....... G06F 16/24568 |

FOREIGN PATENT DOCUMENTS

| | | | |
|---|---|---|---|
| CN | 104834561 | A | 8/2015 |
| EP | 2426606 | A1 * | 7/2011 |
| EP | 2426606 | A1 | 3/2012 |
| EP | 2629247 | A1 | 8/2013 |
| WO | 2012027478 | A1 | 3/2012 |

OTHER PUBLICATIONS

Machine Translation and Abstract of Chinese Publication No. CN103488775, Jan. 1, 2014, 16 pages.
Machine Translation and Abstract of Chinese Publication No. CN104361091, Feb. 18, 2015, 10 pages.
Machine Translation and Abstract of Chinese Publication No. CN104834561, Aug. 12, 2015, 25 pages.
Chuntao, D., et al., "Hadoop YARN Big Data Computing Framework and Resource Scheduling Mechanism," Broad Angle for Technology, Feb. 15, 2015, 8 pages.
English Abstract of Chuntao, D., et al., "Hadoop YARN Big Data Computing Framework and Resource Scheduling Mechanism," Broad Angle for Technology, Feb. 15, 2015, 1 pages.
Gu, L., et al., "Memory or Time: Performance Evaluation for Iterative Operation on Hadoop and Spark," IEEE International Conference on High Performance Computing and Communications & IEEE International Conference on Embedded and Ubiquitous Computing, Dec. 31, 2013, 8 pages.
Foreign Communication From a Counterpart Application, PCT Application No. PCT/CN2016/077379, English Translation of International Search Report dated Jun. 28, 2016, 3 pages.
Foreign Communication From a Counterpart Application, PCT Application No. PCT/CN2016/077379, English Translation of Written Opinion dated Jun. 28, 2016, 6 pages.
Foreign Communication From a Counterpart Application, European Application No. 16785782.0, Extended European Search Report dated Mar. 23, 2018, 11 pages.

* cited by examiner

DATA PROCESSING METHOD AND APPARATUS

CROSS-REFERENCE TO RELATED APPLICATIONS

This application is a continuation of International Application No. PCT/CN2016/077379, filed on Mar. 25, 2016, which claims priority to Chinese Patent Application No. 201510212439.5, filed on Apr. 29, 2015, both of which are hereby incorporated by reference in their entireties.

TECHNICAL FIELD

The present disclosure relates to the field of computer technologies, and in particular, to a data processing method and apparatus.

BACKGROUND

In recent years, with rapid development of social informatization, data has shown an explosive growth in the fields of scientific research, industrial production, business, and Internet. Currently, data in many applications has developed rapidly from a terabyte (TB) level to a petabyte (PB) level or even a higher order of magnitude. Therefore, computing frameworks for big data processing become a hot topic. Representative computing frameworks include Hadoop and Spark. Frameworks such as Hadoop and Spark are widely applied in the field of computer technologies, but each of the computing frameworks has disadvantages. For example, a MapReduce model provided in Hadoop is easily applied, but a computing model has a limitation, the expressiveness is limited, and an algorithm is difficult to be mapped to the MapReduce model when complex problems such as iterative computation and diagram analysis are resolved. Moreover, workload for development is heavy, and the operating efficiency is low. Iterative operation performance of Spark is good, but a requirement on memory is high.

Therefore, a development trend of big data processing is to process big data using a data processing platform integrating multiple types of computing frameworks. That is, multiple types of computing frameworks are contained in a computer cluster using a resource management system, and typical resource management systems are, for example, Mesos and YARN.

However, multiple types of computing frameworks contained in the resource management system share one cluster resource, and programming languages of the computing frameworks are different. Therefore, when receiving a to-be-processed data task, a user usually designates, according to experience, a computing framework to execute the to-be-processed data task rather than selecting a computing framework according to operation time and resource consumption. Consequently, the data processing efficiency is relatively low, and working performance of the system is reduced.

SUMMARY

Embodiments of the present disclosure provide a data processing method and apparatus, so as to resolve problems in the prior art that when a resource management system integrating multiple types of computing frameworks processes a data task, a computing framework is not selected according to operation time and resource consumption, the data processing efficiency is relatively low, and working performance of the system is reduced.

Specific technical solutions provided in the embodiments of the present disclosure are as follows.

According to a first aspect, a data processing method includes receiving a task request, where the task request carries a task submitted by a user; generating a sub-task set including at least one sub-task according to the task in the task request; determining input data for executing each sub-task; performing the following operations for each sub-task in the sub-task set: determining, in all computing frameworks configured in a system, computing frameworks that are capable of executing the sub-task as candidate computing frameworks, where a quantity of the candidate computing frameworks is greater than or equal to 2; separately predicting, according to the input data of the sub-task and a predication model that corresponds to each candidate computing framework, operation time and resource consumption that correspond to each candidate computing framework when the candidate computing framework executes the sub-task; and selecting, in the candidate computing frameworks according to the predicated operation time and resource consumption that correspond to each candidate computing framework when the candidate computing framework executes the sub-task, a target computing framework executing the sub-task; and executing the corresponding sub-task based on the target computing framework that is selected for executing each sub-task in the sub-task set.

With reference to the first aspect, in a first possible implementation manner, the task request further carries input data of the task, and the determining input data for executing each sub-task includes determining the input data for executing each sub-task, according to the input data of the task carried in the task request.

With reference to the first aspect, in a second possible implementation manner, before the receiving a task request, the method further includes encapsulating, in all the computing frameworks configured in the system and using a preset programming language, application program interfaces APIs that are in all computing frameworks capable of executing a task having a same task type and that are capable of executing the task having the same task type, to form a unified API; and the determining, in all computing frameworks configured in a system, computing frameworks that are capable of executing the sub-task as candidate computing frameworks includes determining a task type of the sub-task; determining a unified API corresponding to the task type of the sub-task; and determining, according to the determined unified API, all computing frameworks capable of executing the sub-task of the task type, and using the determined computing frameworks as the candidate computing frameworks.

With reference to any one of the first aspect or the first to the second possible implementation manners of the first aspect, in a third possible implementation manner, obtaining a predication model corresponding to a candidate computing framework includes reading a preset training sample set, where the training sample set is preset for a capability of the candidate computing framework for executing the sub-task; and training, using operation time and resource consumption as target features separately, other features other than the operation time and the resource consumption in the training sample set, to obtain the predication model corresponding to the candidate computing framework.

With reference to any one of the first aspect or the first to the third possible implementation manners of the first aspect, in a fourth possible implementation manner, the selecting, in the candidate computing frameworks according to the predicated operation time and resource consumption that correspond to each candidate computing framework when the candidate computing framework executes the sub-task, a target computing framework executing the sub-task includes selecting, in the candidate computing frameworks, a candidate computing framework whose predicated resource consumption is less than an available resource of the system as a first candidate computing framework; and selecting, in the first candidate computing framework, a first candidate computing framework whose predicated operation time is the shortest as the target computing framework.

With reference to the third possible implementation manner of the first aspect, in a fifth possible implementation manner, after the executing the corresponding sub-task based on the target computing framework that is determined for executing each sub-task in the sub-task set, the method further includes using each feature that is generated during execution of the sub-task in the target computing framework of the sub-task as a new training sample; and adding the new training sample to the training sample set.

According to a second aspect, a data processing apparatus includes a receiving unit configured to receive a task request, where the task request carries a task submitted by a user; a generation unit configured to generate a sub-task set including at least one sub-task according to the task in the task request; a determining unit configured to determine input data for executing each sub-task; a processing unit configured to perform the following operations for each sub-task in the sub-task set: determining, in all computing frameworks configured in a system, computing frameworks that are capable of executing the sub-task as candidate computing frameworks, where a quantity of the candidate computing frameworks is greater than or equal to 2; separately predicting, according to the input data of the sub-task and a predication model that corresponds to each candidate computing framework, operation time and resource consumption that correspond to each candidate computing framework when the candidate computing framework executes the sub-task; and selecting, in the candidate computing frameworks according to the predicated operation time and resource consumption that correspond to each candidate computing framework when the candidate computing framework executes the sub-task, a target computing framework executing the sub-task; and a running unit configured to execute the corresponding sub-task based on the target computing framework that is selected for executing each sub-task in the sub-task set.

With reference to the second aspect, in a first possible implementation manner, the task request received by the receiving unit further carries input data of the task, and the determining unit is configured to determine the input data for executing each sub-task, according to the input data of the task carried in the task request.

With reference to the second aspect, in a second possible implementation manner, a configuration unit is configured to, before the task request is received, encapsulate, in all the computing frameworks configured in the system and using a preset programming language, application program interfaces APIs that are in all computing frameworks capable of executing a task having a same task type and that are capable of executing the task having the same task type, to form a unified API, where when determining, in all the computing frameworks configured in the system, the computing frameworks that are capable of executing the sub-task as the candidate computing frameworks, the processing unit is configured to determine a task type of the sub-task; determine a unified API corresponding to the task type of the sub-task; and determine, according to the determined unified API, all computing frameworks capable of executing the sub-task of the task type, and use the determined computing frameworks as the candidate computing frameworks.

With reference to any one of the second aspect or the first to the second possible implementation manners of the second aspect, in a third possible implementation manner, when obtaining a predication model corresponding to a candidate computing framework, the processing unit is configured to read a preset training sample set, where the training sample set is preset for a capability of the candidate computing framework for executing the sub-task; and train, using operation time and resource consumption as target features separately, other features other than the operation time and the resource consumption in the training sample set, to obtain the predication model corresponding to the candidate computing framework.

With reference to any one of the second aspect or the first to the third possible implementation manners of the second aspect, in a fourth possible implementation manner, the selecting, by the processing unit, a target computing framework executing the sub-task includes selecting, in the candidate computing frameworks, a candidate computing framework whose predicated resource consumption is less than an available resource of the system as a first candidate computing framework; and selecting, in the first candidate computing framework, a first candidate computing framework whose predicated operation time is the shortest as the target computing framework.

With reference to the third possible implementation manner of the second aspect, in a fifth possible implementation manner, the running unit further configured to, after executing the corresponding sub-task based on the target computing framework that is determined for executing each sub-task in the sub-task set, use each feature that is generated during execution of the sub-task in the target computing framework of the sub-task as a new training sample; and add the new training sample to the training sample set.

Using the technical solutions of the present disclosure, when multiple computing frameworks can execute a same sub-task, a target computing framework is selected from the multiple computing frameworks according to operation time and resource consumption, to execute a sub-task, so as to improve the data processing efficiency and working performance of a system.

DESCRIPTION OF EMBODIMENTS

Using a data processing method provided in the present disclosure, after a task request carrying a task submitted by a user is received, a sub-task set including at least one sub-task is generated according to the task; input data for executing each sub-task is determined, and the following operations are performed for each sub-task in the sub-task set, to determine a target computing framework executing each sub-task: determining, in all computing frameworks configured in a system, computing frameworks that are capable of executing the sub-task as candidate computing frameworks, where a quantity of the candidate computing frameworks is greater than or equal to 2; separately predicting, according to the input data of the sub-task and a predication model that corresponds to each candidate computing framework, operation time and resource consumption that correspond to each candidate computing framework when the candidate computing framework executes the sub-task; and selecting, in the candidate computing frameworks according to the predicated operation time and resource consumption that correspond to each candidate computing framework when the candidate computing framework executes the sub-task, the target computing framework executing the sub-task; and the corresponding sub-task is executed based on the target computing framework that is determined for executing each sub-task in the sub-task set. In this way, a resource management system selects a target computing framework from multiple computing frameworks according to operation time and resource consumption, to execute each sub-task, so as to improve the data processing efficiency and working performance of the system.

Embodiments of the present disclosure provide a data processing method and apparatus, and a terminal device, applied to a resource management system integrating multiple types of computing frameworks. The following describes in detail a implementation manner of the present disclosure with reference to the accompanying drawings.

Figure 1:
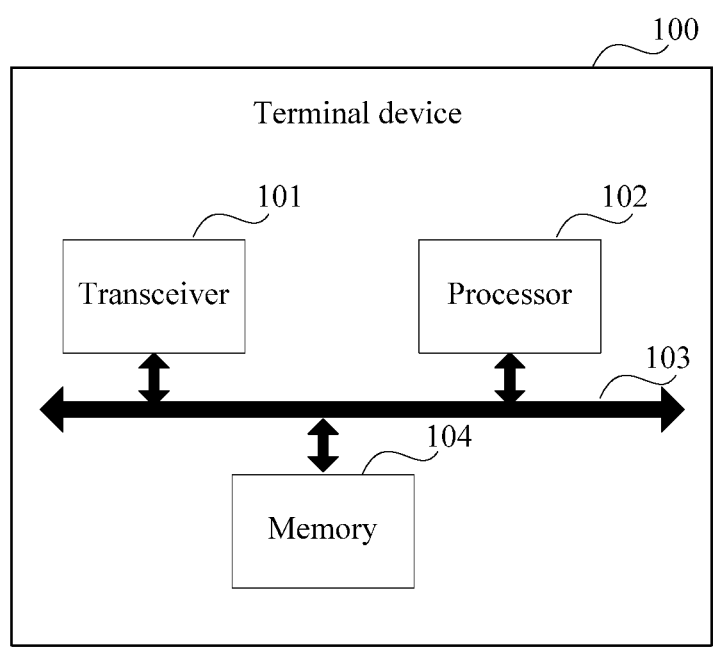
FIG. 1 is a schematic structural diagram of a terminal device according to an embodiment of the present disclosure.

An embodiment of the present disclosure further provides a terminal device 100. The terminal device is a device integrating multiple types of computing frameworks, for example, a computer. Referring to FIG. 1, the terminal device 100 includes a transceiver 101, a processor 102, a bus 103, and a memory 104.

The transceiver 101, the processor 102, and the memory 104 are connected to each other using the bus 103. The bus 103 may be a peripheral component interconnect (PCI) bus, an extended industry standard architecture (EISA) bus, or the like. The bus may be classified into an address bus, a data bus, a control bus, or the like. For the convenience of representation, only one bold line is used for representation in FIG. 1, but it does not represent that there is only one bus or one type of bus.

The transceiver 101 is configured to communicate with another connected device, for example, receive a task request.

Figure 2:
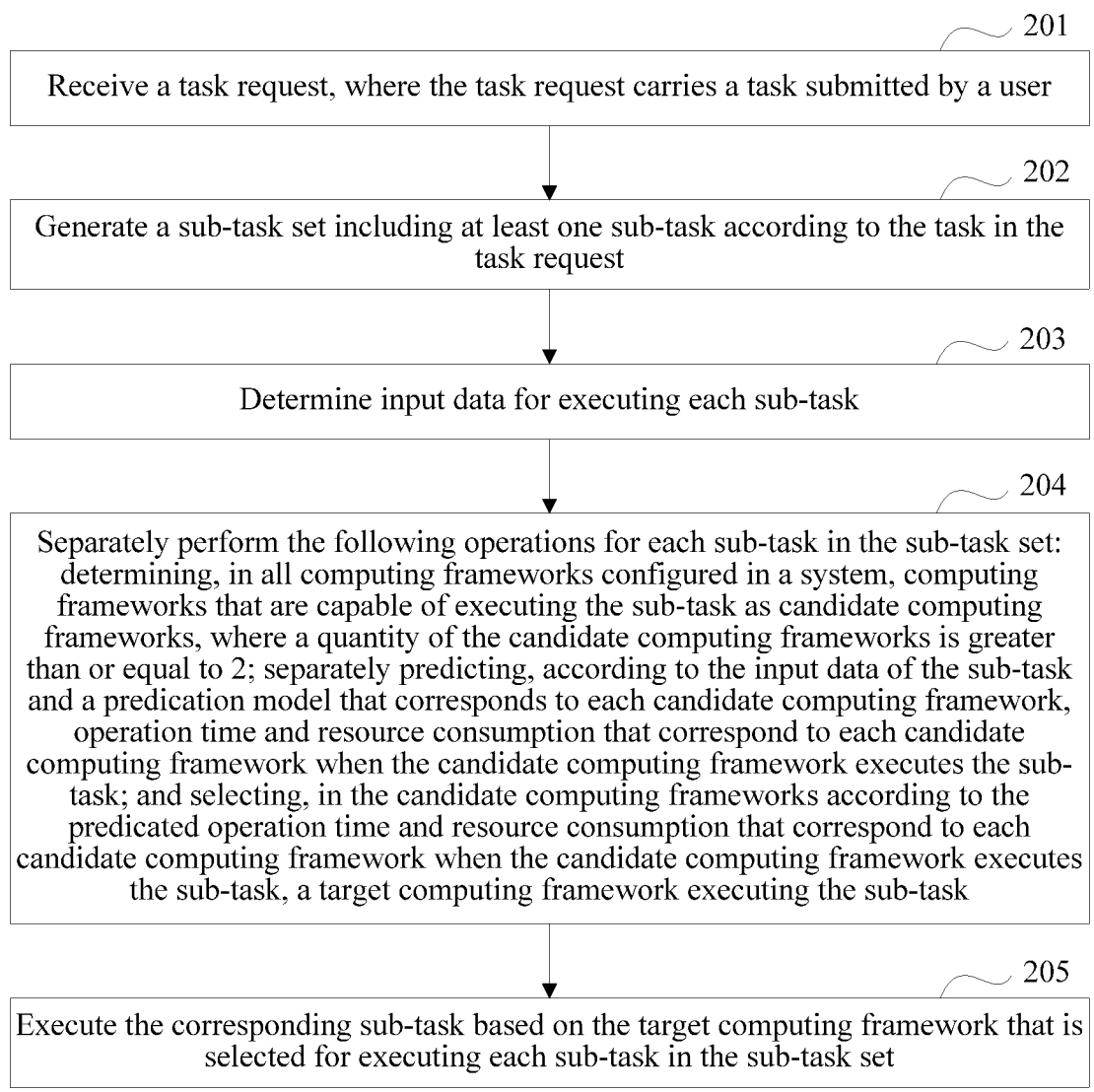
FIG. 2 is a flowchart of details of a data processing method according to an embodiment of the present disclosure.

The processor 102 is configured to implement a data processing method shown in FIG. 2 in an embodiment of the present disclosure. The method includes receiving a task request, where the task request carries a task submitted by a user; generating a sub-task set including at least one sub-task according to the task in the task request; determining input data for executing each sub-task; performing the following operations for each sub-task in the sub-task set: determining, in all computing frameworks configured in a system, computing frameworks that are capable of executing the sub-task as candidate computing frameworks, where a quantity of the candidate computing frameworks is greater than or equal to 2; separately predicting, according to the input data of the sub-task and a predication model that corresponds to each candidate computing framework, operation time and resource consumption that correspond to each candidate computing framework when the candidate computing framework executes the sub-task; and selecting, in the candidate computing frameworks according to the predicated operation time and resource consumption that correspond to each candidate computing framework when the candidate computing framework executes the sub-task, a target computing framework executing the sub-task; and executing the corresponding sub-task based on the target computing framework that is selected for executing each sub-task in the sub-task set.

Optionally, the task request further carries input data of the task; and the determining input data for executing each sub-task includes determining the input data for executing each sub-task, according to the input data of the task carried in the task request.

Optionally, before the receiving the task request, the method further includes encapsulating, in all the computing frameworks configured in the system and using a preset programming language, application program interfaces (API) that are in all computing frameworks capable of executing a task having a same task type and that are capable of executing the task having the same task type, to form a unified API; and the determining, in all computing frameworks configured in a system, computing frameworks that are capable of executing the sub-task as candidate computing frameworks includes determining a task type of the sub-task; determining a unified API corresponding to the task type of the sub-task; and determining, according to the determined unified API, all computing frameworks capable of executing the sub-task of the task type, and using the determined computing frameworks as the candidate computing frameworks.

Optionally, obtaining a predication model corresponding to a candidate computing framework includes reading a preset training sample set, where the training sample set is preset for a capability of the candidate computing framework for executing the sub-task; and training, using operation time and resource consumption as target features separately, other features other than the operation time and the resource consumption in the training sample set, to obtain the predication model corresponding to the candidate computing framework.

Optionally, the selecting, in the candidate computing frameworks according to the predicated operation time and resource consumption that correspond to each candidate computing framework when the candidate computing framework executes the sub-task, a target computing framework executing the sub-task includes selecting, in the candidate computing frameworks, a candidate computing framework whose predicated resource consumption is less than an available resource of the system as a first candidate computing framework; and selecting, in the first candidate computing framework, a first candidate computing framework whose predicated operation time is the shortest as the target computing framework.

Optionally, after the executing the corresponding sub-task based on the target computing framework that is determined for executing each sub-task in the sub-task set, the method further includes using each feature that is generated during execution of the sub-task in the target computing framework of the sub-task as a new training sample; and adding the new training sample to the training sample set that is preset for a capability of the target computing framework for executing the sub-task.

The terminal device 100 further includes the memory 104 configured to store a program, a predication model of each computing framework, a training sample set corresponding to each predication model obtained through training, and the like. The program may include program code, and the program code includes a computer operation instruction. The memory 104 may include a random access memory (RAM), or may further include a non-volatile memory, such as at least one magnetic disk memory. The processor 102 executes the application program stored in the memory 104, to implement the data processing method.

Referring to FIG. 2, a specific processing procedure of a data processing method according to an embodiment of the present disclosure includes the following steps.

Step 201: Receive a task request, where the task request carries a task submitted by a user.

The task submitted by the user is a task of processing a large volume of data, for example, selecting data meeting a given condition from data in a data sheet in a database. Optionally, the task request may further carry input data of the task submitted by the user.

Optionally, before step 201 is performed, the method further includes encapsulating, in all computing frameworks configured in a system and using a preset programming language, API that are in all computing frameworks capable of executing a task having a same task type and that are capable of executing the task having the same task type, to form a unified API.

For computing frameworks integrated in a resource management system, for example, Hadoop and Spark, different computing frameworks may use different programming languages. For example, Spark uses the scalable programming language (Scala), but Hadoop uses the JAVA programming language. Moreover, each computing framework may implement multiple different types of functions, that is, each computing framework is capable of executing multiple types of tasks, so that each computing framework provides a corresponding API to implement each function that the computing framework can implement. A developer needs to grasp multiple programming languages. A programming threshold is relatively high, and the system development efficiency is relatively low. Compared with the prior art, in this embodiment of the present disclosure, the APIs that are in the different computing frameworks and that are for the same function are encapsulated to form the unified API. Therefore, when the function is implemented, only the corresponding unified API needs to be invoked, and a computing framework in the computing frameworks that can implement the function does not need to be designated.

The unified API may be implemented using any programming language. The following uses an example in which a programming language of the unified API is JAVA. When APIs of the computing frameworks are encapsulated into the unified API, the method includes the following steps. If a programming language of an API provided by a computing framework is JAVA, parameters need to be recombined only according to a requirement of the API of the computing framework, so that the API can be encapsulated into the unified API; or if a programming language of an API provided by a computing framework is another programming language other than JAVA, the API needs to be invoked using a cross-programming language specification of the JAVA, so that the API is encapsulated into the unified API.

The cross-programming language specification of JAVA is the prior art. For example, when an API programmed with a Scala programming language is invoked using the JAVA programming language, because the API programmed with the Scala programming language is based on a JAVA virtual machine (JVM), an API programmed with the Scala programming language can be directly invoked using the JAVA programming language. When an API programmed with a C/C++ programming language is invoked using the JAVA programming language, the API may be invoked using a JAVA native interface (JNI); and when an API programmed with a Python programming language is invoked using the JAVA programming language, the API may be invoked using Jython.jar.

APIs that are in different computing frameworks and that execute a same type of task are encapsulated using a preset programming language, to generate a unified API, so as to shield differences between programming languages, greatly reduce a programming threshold for a developer, and improve flexibility and adaptability of each computing framework.

Optionally, after the APIs that are in different computing frameworks and that execute the same type of task are encapsulated using the preset programming language to generate the unified API, the task that is submitted by the user and that is carried in the received task request may be a task that is described using a programming language communicating with the programming language of the unified API.

Step 202: Generate a sub-task set including at least one sub-task according to the task in the task request.

Figure 3:
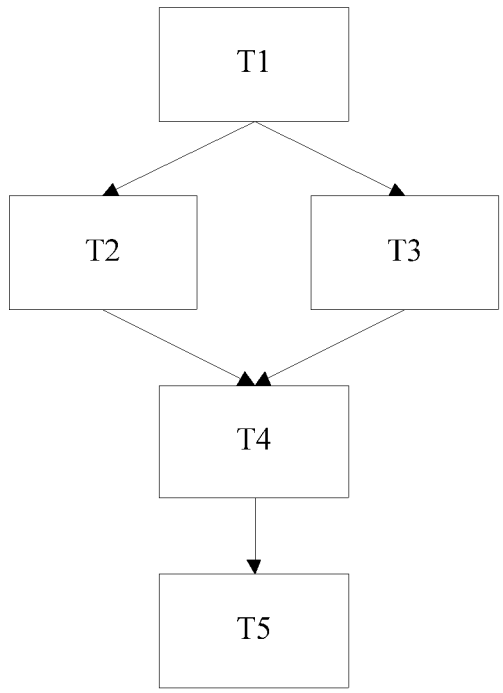
FIG. 3 is a schematic exploded view of a task according to an embodiment of the present disclosure.

Optionally, the task submitted by the user includes multiple sub-tasks. A distribution sequence of the sub-tasks in the task is similar to a directed acyclic graph. Referring to FIG. 3, a task T includes five sub-tasks, respectively T1, T2, T3, T4, and T5. Task decomposition processing is performed on the task T. The task T may be decomposed into T1->T2->T3->T4->T5 or T1->T3->T2->T4->T5, T2 and T3 may be executed simultaneously, and the other steps are performed sequentially. That task decomposition is performed on a task that is similar to a directed acyclic graph, to generate a sub-task set belongs to the prior art, and details are not described in this embodiment of the present disclosure.

Step 203: Determine input data for executing each sub-task.

When the task request carries input data of the task submitted by the user, the input data of each sub-task is directly determined according to the input data of the task, or corresponding input data is directly determined according to each sub-task.

Step 204: Perform the following operations for each sub-task in the sub-task set: determining, in all computing frameworks configured in a system, computing frameworks that are capable of executing the sub-task as candidate computing frameworks, where a quantity of the candidate computing frameworks is greater than or equal to 2; separately predicting, according to the input data of the sub-task and a predication model that corresponds to each candidate computing framework, operation time and resource consumption that correspond to each candidate computing framework when the candidate computing framework executes the sub-task; and selecting, in the candidate computing frameworks according to the predicated operation time and resource consumption that correspond to each candidate computing framework when the candidate computing framework executes the sub-task, a target computing framework executing the sub-task.

The determining, in all computing frameworks configured in a system, computing frameworks that are capable of executing the sub-task as candidate computing frameworks includes determining a task type of the sub-task; determining a unified API corresponding to the task type of the sub-task; and determining, according to the determined unified API, all computing frameworks capable of executing the sub-task of the task type, and using the determined computing frameworks as the candidate computing frameworks.

Optionally, the predication model may be preset by the user, or may be obtained by means of machine learning. Obtaining, by means of machine learning, a predication model corresponding to a candidate computing framework capable of executing the sub-task includes reading a preset training sample set, where the training sample set is preset for a capability of the candidate computing framework for executing the sub-task; and training, using operation time and resource consumption as target features separately, other features other than the operation time and the resource consumption in the training sample set, to obtain the predication model corresponding to the candidate computing framework.

The resource consumption may be memory usage, central processing unit (CPU) usage, input/output (I/O) usage, and the like. This is not limited in this embodiment of the present disclosure.

When the training sample set is trained, many types of machine learning algorithms, for example, a linear regression algorithm and a support vector machine algorithm, may be used, and the obtained predication model may be, for example: the operation time=0.83*a quantity of lines of the input data+0.24*a quantity of rows of the input data+0.1; and the memory usage=0.24*a quantity of lines of the input data+0.14*a quantity of rows of the input data+0.15.

The selecting, in the candidate computing frameworks according to the predicated operation time and resource consumption that correspond to each candidate computing framework when the candidate computing framework executes the sub-task, a target computing framework executing the sub-task includes selecting, in the candidate computing frameworks, a candidate computing framework whose predicated resource consumption is less than an available resource of the system as a first candidate computing framework; and selecting, in the first candidate computing framework, a first candidate computing framework whose predicated operation time is the shortest as the target computing framework.

In this way, the candidate computing framework whose resource consumption is less than the available resource and that has the shortest operation time is dynamically selected to execute the sub-task, thereby improving efficiency of executing the sub-task, and improving working performance of the system.

Step 205: Execute the corresponding sub-task based on the target computing framework that is selected for executing each sub-task in the sub-task set.

The target computing framework of each sub-task executes the sub-task according to the API corresponding to the task type of the sub-task.

After each sub-task in the sub-task set is executed, an obtained result is a result of the task submitted by the user.

After step 205 of executing the corresponding sub-task based on the target computing framework that is selected for executing each sub-task in the sub-task set, the method further includes using each feature that is generated during execution of the sub-task in the target computing framework of the sub-task as a new training sample; and adding the new training sample to the training sample set, where the training sample set is preset for the capability of executing the sub-task by the target computing framework.

In this way, each feature that is generated when the computing framework actually executes the task is used as a new training sample, the training sample set is continually supplemented, and machine learning is performed according to the supplemented training sample set, to generate a new predication model, thereby improving accuracy of the predication model.

According to the data processing method provided in this embodiment of the present disclosure, when multiple computing frameworks can execute a same task, a target computing framework is selected from the multiple computing frameworks according to operation time and resource consumption, to execute a sub-task, so as to improve the data processing efficiency and working performance of the system. APIs that are in different computing frameworks and that execute a same type of task are encapsulated using a preset programming language, to generate a unified API, so as to shield differences between programming languages, greatly reduce a programming threshold for a developer, and improve flexibility and adaptability of each computing framework.

Example 1: A task request is received, where a task T that is submitted by a user and that is carried in the task request includes the following Structured Query Language (SQL) sentences:

"SELECT S# as Student ID
,(SELECT score FROM SC WHERE SC.S#=t.S# AND C#='001')
AS Database
,(SELECT score FROM SC WHERE SC.S#=t.S# AND C#='002')
AS English
,(SELECT score FROM SC WHERE SC.S#=t.S# AND C#='003')
AS Algorithm, COUNT(t.C#) AS a quantity of effective courses,
AVG(t.score) AS an average score FROM SC AS t
GROUP BY t.S#
ORDER BY avg(t.Score)"

The task expressed by the foregoing SQL sentences is to display scores of three courses 'Database', 'English', and 'Algorithm' of all students in descending order according to the 'average scores', and display results in the following form: student ID, database, English, algorithm, a quantity of effective courses, and average score". A student table is shown in Table 1, a school timetable is shown in Table 2, and a grade table is shown in Table 3.

TABLE 1

| Student table | |
|---|---|
| S# | Sname |
| 1 | Zhang San |
| 2 | Li Si |
| 3 | Zhao Wu |

TABLE 2

| School timetable | |
|---|---|
| C# | Cname |
| 001 | Database |
| 002 | English |
| 003 | Algorithm |

TABLE 3

Grade table

| S# | C# | Score |
|---|---|---|
| 1 | 001 | 85 |
| 2 | 001 | 90 |
| 3 | 001 | 95 |
| 1 | 002 | 90 |
| 2 | 002 | 80 |
| 3 | 002 | 70 |
| 1 | 003 | 60 |
| 2 | 003 | 80 |
| 3 | 003 | 100 |

The task T is decomposed to obtain a sub-task set including three sub-tasks, respectively: T1, selecting related data; T2, forming a new data sheet according to results of T1; and T3, ranking results of T2 in descending order according to the 'average scores'. SQL sentences corresponding to the sub-tasks are shown in Table 4.

TABLE 4

SQL sentences corresponding to the sub-tasks

T1 SELECT S# as Student ID
 ,(SELECT score FROM SC WHERE SC.S#=t.S# AND C#='001') AS Database
 ,(SELECT score FROM SC WHERE SC.S#=t.S# AND C#='002') AS English
 , (SELECT score FROM SC WHERE SC.S#=t.S# AND C#='003') AS Algorithm, t.C#
 as Course ID FROM SC AS t
T2 SELECT Student ID, Database, English, Algorithm, count (Course ID) as A quantity of
 effective courses FROM results of T1 GROUP BY the Student ID
T3 SELECT Student ID, Database, English, Algorithm, A quantity of effective courses, avg
 (Database, English, and Algorithm) as an average score FROM results of T2 ORDER
 BY avg (Database, English, and Algorithm)

When a target computing framework is dynamically selected for each sub-task, a computing framework whose resource consumption is less than an available resource and that has the shortest operation time is usually selected. In this example, it is assumed that each of the sub-tasks has two optional computing frameworks: Hadoop and Spark. Input data corresponding to the task submitted by the user is the grade table. Features of the input data include a quantity of lines, a quantity of rows, and the like. It is assumed that the quantity of lines of the grade table is 25,415,996, and the quantity of rows is 3. A predication model corresponding to each computing framework for executing each sub-task is shown in Table 5. In this embodiment, the predication model includes an operation time predication model and a memory usage predication model.

TABLE 5

Predication models of computing frameworks for executing different sub-tasks

| Computing framework | Sub-task | Operation time predication model (millisecond) | Memory usage predication model (MB) |
|---|---|---|---|
| Hadoop | T1 | 0.0001r + 0.00034c | 0.00015r + 0.00024c |
| Hadoop | T2 | 0.00002r + 0.00064c | 0.00005r + 0.00004c |
| Hadoop | T3 | 0.00005r + 0.00004c | 0.00003r + 0.00009c |
| Spark | T1 | 0.00001r + 0.00004c | 0.00055r + 0.00064c |
| Spark | T2 | 0.0002r + 0.0016c | 0.00035r + 0.00084c |
| Spark | T3 | 0.00005r + 0.0004c | 0.00093r + 0.0009c |

The r is the quantity of lines of the input data, and c is the quantity of rows of the input data; and r=25415996 and c=3 are substituted into the corresponding predication model corresponding to each computing framework for executing different sub-tasks in Table 5, to obtain operation time and memory usage of each computing framework for executing each sub-task, as shown in Table 6.

TABLE 6

Operation time and memory usage of the computing frameworks for executing each sub-task

| Computing framework | Sub-task | Operation time (millisecond) | Memory usage (MB) |
|---|---|---|---|
| Hadoop | T1 | 2541.60062 | 3812.40012 |
| Hadoop | T2 | 508.32184 | 1270.79992 |
| Hadoop | T3 | 1270.79992 | 762.48015 |
| Spark | T1 | 254.16008 | 13978.79972 |
| Spark | T2 | 5083.204 | 8895.60112 |
| Spark | T3 | 1270.801 | 23636.87898 |

It is assumed that an available memory of a system is 15,000 MB.

For T1, it is predicated that the memory usage is 3,812.40012 megabytes (MB) when T1 is executed using Hadoop, but the memory usage is 13,978.79972 MB when T1 is executed using Spark. Both the two memory usages are less than the available memory 15,000 MB of the system. However, the predicated operation time in Spark is 354.16008 milliseconds, and is less than the predicated operation time of 2,541.60062 milliseconds in Hadoop. Therefore, Spark is used for executing T1.

For T2, it is predicated that the memory usage is 1,270.79992 MB when T2 is executed using Hadoop, but the memory usage is 8,895.60112 MB when T2 is executed using Spark. Both the two memory usages are less than the available memory 15,000 MB of the system. However, the predicated operation time in Spark is 5,083.204 milliseconds, and is greater than the predicated operation time of 508.32184 milliseconds in Hadoop. Therefore, Hadoop is used for executing T2.

For T3, it is predicated that the memory usage is 23,636.87898 MB when T3 is executed using Spark. Because the memory usage is greater than the available memory 15,000 MB of the system, Spark cannot be selected. It is predicated that the memory usage is 762.48015 MB when T3 is executed using Hadoop. Because the memory usage is less than the available memory 15,000 MB of the system, Hadoop is used for executing T3.

It is determined that the target computing framework of T1 is Spark, the target computing framework of T2 is Hadoop, and the target computing framework of T3 is Hadoop. T1, T2, and T3 are executed sequentially and respectively using Spark, Hadoop, and Hadoop, to obtain final results.

Results that are obtained after T1 is executed using Spark are shown in Table 7, results that are obtained after T2 is executed using Hadoop are shown in Table 8, and results that are obtained after T3 is executed using Hadoop are shown in Table 9.

TABLE 7

Results of T1

| Student ID | Database | English | Algorithm | Course ID |
|---|---|---|---|---|
| 1 | 85 | 90 | 60 | 001 |
| 1 | 85 | 90 | 60 | 002 |
| 1 | 85 | 90 | 60 | 003 |
| 2 | 90 | 80 | 80 | 001 |
| 2 | 90 | 80 | 80 | 002 |
| 2 | 90 | 80 | 80 | 003 |
| 3 | 95 | 70 | 100 | 001 |
| 3 | 95 | 70 | 100 | 002 |
| 3 | 95 | 70 | 100 | 003 |

TABLE 8

Results of T2

| Student ID | Database | English | Algorithm | A quantity of effective courses |
|---|---|---|---|---|
| 1 | 85 | 90 | 60 | 3 |
| 2 | 90 | 80 | 80 | 3 |
| 3 | 95 | 70 | 100 | 3 |

TABLE 9

Results of T3

| Student ID | Database | English | Algorithm | A quantity of effective courses | Average score |
|---|---|---|---|---|---|
| 1 | 85 | 90 | 60 | 3 | 78.333 |
| 2 | 90 | 80 | 80 | 3 | 83.333 |
| 3 | 95 | 70 | 100 | 3 | 88.333 |

Table 9 is the final results of the task T.

Figure 4:
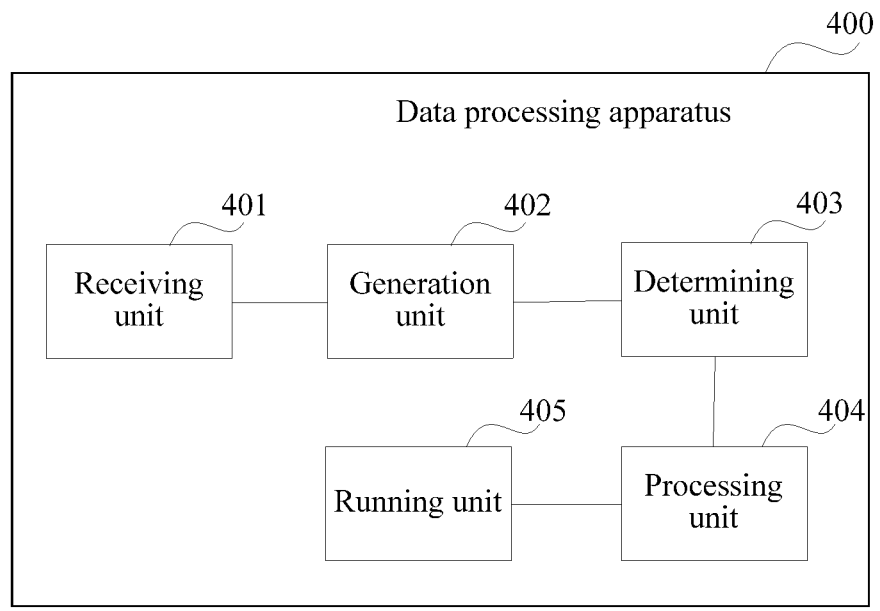
FIG. 4 is a schematic structural diagram of a data processing apparatus according to an embodiment of the present disclosure.

Based on the foregoing embodiments, the present disclosure further provides a data processing apparatus 400. As shown in FIG. 4, the apparatus 400 includes a receiving unit 401, a generation unit 402, a determining unit 403, a processing unit 404, and a running unit 405.

The receiving unit 401 is configured to receive a task request, where the task request carries a task submitted by a user.

The generation unit 402 is configured to generate a sub-task set including at least one sub-task according to the task in the task request.

The determining unit 403 is configured to determine input data for executing each sub-task.

The processing unit 404 is configured to perform the following operations for each sub-task in the sub-task set: determining, in all computing frameworks configured in a system, computing frameworks that are capable of executing the sub-task as candidate computing frameworks, where a quantity of the candidate computing frameworks is greater than or equal to 2; separately predicting, according to the input data of the sub-task and a predication model that corresponds to each candidate computing framework, operation time and resource consumption that correspond to each candidate computing framework when the candidate computing framework executes the sub-task; and selecting, in the candidate computing frameworks according to the predicated operation time and resource consumption that correspond to each candidate computing framework when the candidate computing framework executes the sub-task, a target computing framework executing the sub-task.

The running unit 405 is configured to execute the corresponding sub-task based on the target computing framework that is selected for executing each sub-task in the sub-task set.

The task request received by the receiving unit 401 further carries input data of the task; and the determining unit 403 is configured to determine the input data for executing each sub-task, according to the input data of the task carried in the task request.

The data processing apparatus 400 further includes a configuration unit 406 configured to, before the task request is received, in all the computing frameworks configured in the system, encapsulate, using a preset programming language, APIs that are in all computing frameworks having a task having a same executable task type and that execute the task having the same task type, to form a unified API; and when determining, in all the computing frameworks configured in the system, the computing frameworks that are capable of executing the sub-task as the candidate computing frameworks, the processing unit 404 is configured to determine a task type of the sub-task; determine a unified API corresponding to the task type of the sub-task; and determine, according to the determined unified API, all computing frameworks capable of executing the sub-task of the task type, and use the determined computing frameworks as the candidate computing frameworks.

When obtaining a predication model corresponding to the candidate computing framework, the processing unit 404 is configured to read a preset training sample set, where the training sample set is preset for a capability of the candidate computing framework for executing the sub-task; and train, using operation time and resource consumption as target features separately, other features other than the operation time and the resource consumption in the training sample set, to obtain the predication model corresponding to the candidate computing framework.

The selecting, by the processing unit 404, a target computing framework for executing the sub-task includes selecting, in the candidate computing frameworks, a candidate computing framework whose predicated resource consumption is less than an available resource of the system as a first candidate computing framework; and selecting, in the first candidate computing framework, a first candidate computing framework whose predicated operation time is the shortest as the target computing framework.

The running unit 405 is further configured to, after executing the corresponding sub-task based on the target computing framework that is determined for executing each sub-task in the sub-task set, use each feature that is generated during execution of the sub-task in the target computing framework of the sub-task as a new training sample; and add the new training sample to the training sample set that is preset for a capability of the target computing framework for executing the sub-task.

In conclusion, according to the data processing method and apparatus provided in the embodiments of the present disclosure, in the method, after a task request carrying a task submitted by a user is received, a sub-task set including at least one sub-task is generated according to the task; input data for executing each sub-task is determined, and the following operations are performed for each sub-task in the sub-task set, to determine a target computing framework executing each sub-task: determining, in all computing frameworks configured in a system, computing frameworks that are capable of executing the sub-task as candidate computing frameworks, where a quantity of the candidate computing frameworks is greater than or equal to 2; separately predicting, according to the input data of the sub-task and a predication model that corresponds to each candidate computing framework, operation time and resource consumption that correspond to each candidate computing framework when the candidate computing framework executes the sub-task; and selecting, in the candidate computing frameworks according to the predicated operation time and resource consumption that correspond to each candidate computing framework when the candidate computing framework executes the sub-task, the target computing framework executing the sub-task; and the corresponding sub-task is executed respectively based on the target computing framework that is determined for executing each sub-task in the sub-task set. In this way, a resource management system selects a target computing framework from multiple computing frameworks according to operation time and resource consumption, to execute each sub-task, so as to improve the data processing efficiency and working performance of the system.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, a person skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A data processing method, comprising:
receiving a task request that carries a task submitted by a user;
generating a sub-task set comprising at least one sub-task according to the task in the task request;
determining input data for executing each sub-task in the sub-task set;
performing the following operations for each sub-task in the sub-task set;
determining, in all computing frameworks configured in a system, computing frameworks capable of executing the sub-task as candidate computing frameworks, wherein a quantity of the candidate computing frameworks is greater than or equal to two;
separately predicting, according to the input data of the sub-task and a prediction model that corresponds to each candidate computing framework, operation time and resource consumption that correspond to each candidate computing framework for executing the sub-task; and
selecting, in the candidate computing frameworks according to the operation time and the resource consumption that correspond to each candidate computing framework for executing the sub-task, a fixed target computing framework for executing the sub-task; and
subsequent to selecting the fixed target computing framework, executing the corresponding sub-task based on the fixed target computing framework selected for executing each sub-task in the sub-task set.

2. The method of claim 1, wherein the task request further carries input data of the task, and wherein determining the input data for executing each sub-task comprises determining the input data for executing each sub-task according to the input data of the task carried in the task request.

3. The method of claim 1, wherein before receiving the task request, the method further comprises encapsulating, in all the computing frameworks configured in the system and using a preset programming language, application program interfaces (APIs) that are in all computing frameworks capable of executing a task having a same task type and that are capable of executing the task having the same task type to form a unified API, and wherein determining the computing frameworks that are capable of executing the sub-task as candidate computing frameworks comprises:

determining a task type of the sub-task;
determining a unified API corresponding to the task type of the sub-task;
determining, according to the determined unified API, all computing frameworks capable of executing the sub-task of the task type; and
using the determined computing frameworks as the candidate computing frameworks.

4. The method of claim 1, wherein obtaining the prediction model corresponding to the candidate computing framework comprises:
reading a preset training sample set, wherein the preset training sample set is preset for a capability of the candidate computing framework for executing the sub-task; and
training, using the operation time and the resource consumption as target features separately, features other than the operation time and the resource consumption in the preset training sample set to obtain the prediction model corresponding to the candidate computing framework.

5. The method of claim 1, wherein selecting the fixed target computing framework comprises:
selecting, in the candidate computing frameworks, a candidate computing framework whose predicted resource consumption is less than an available resource of the system as a first candidate computing framework; and
selecting, in the first candidate computing framework, a first candidate computing framework whose predicted operation time is the shortest as the fixed target computing framework.

6. The method of claim 4, wherein after executing the corresponding sub-task, the method further comprises:
using each feature generated during execution of the sub-task in the fixed target computing framework of the sub-task as a new training sample; and
adding the new training sample to the preset training sample set.

7. A data processing apparatus, comprising:
a processor; and
a non-transitory computer-readable storage medium coupled to the processor and configured to store programming instructions for execution by the processor, wherein the programming instructions comprise:
instructions for receiving a task request that carries a task submitted by a user;
instructions for generating a sub-task set comprising at least one sub-task according to the task in the task request;
instructions for determining input data for executing each sub-task;
for each sub-task in the sub-task set:
instructions for determining, in all computing frameworks configured in a system, computing frameworks that are capable of executing the sub-task as candidate computing frameworks, wherein a quantity of the candidate computing frameworks is greater than or equal to two;
instructions for separately predicting, according to the input data of the sub-task and a prediction model that corresponds to each candidate computing framework, operation time and resource consumption that correspond to each candidate computing framework for executing the sub-task; and
instructions for selecting, in the candidate computing frameworks according to the operation time and the resource consumption that correspond to each candidate computing framework for executing the sub-task, a fixed target computing framework for executing the sub-task; and
instructions for executing, subsequent to selecting the fixed target computing framework, the corresponding sub-task based on the fixed target computing framework selected for executing each sub-task in the sub-task set.

8. The apparatus of claim 7, wherein the task request further carries input data of the task, and wherein the programming instructions further comprise instructions for determining the input data for executing each sub-task according to the input data of the task carried in the task request.

9. The apparatus of claim 7, wherein the programming instructions further comprise instructions for encapsulating, before the task request is received, in all the computing frameworks configured in the system and using a preset programming language, application program interfaces (APIs) that are in all computing frameworks capable of executing a task having a same task type and that are capable of executing the task having the same task type to form a unified API, and wherein when determining the computing frameworks capable of executing the sub-task as the candidate computing frameworks, the programming instructions further comprise:
instructions for determining a task type of the sub-task;
instructions for determining a unified API corresponding to the task type of the sub-task; and
instructions for determining, according to the determined unified API, all computing frameworks capable of executing the sub-task of the task type; and
instructions for using the determined computing frameworks as the candidate computing frameworks.

10. The apparatus of claim 7, wherein when obtaining the prediction model corresponding to the candidate computing framework, the programming instructions further comprise:
instructions for reading a preset training sample set, wherein the preset training sample set is preset for a capability of the candidate computing framework for executing the sub-task; and
instructions for training, using the operation time and the resource consumption as target features separately, features other than the operation time and the resource consumption in the preset training sample set to obtain the prediction model corresponding to the candidate computing framework.

11. The apparatus of claim 7, wherein the instructions for selecting the fixed target computing framework comprise:
instructions for selecting, in the candidate computing frameworks, a candidate computing framework whose predicted resource consumption is less than an available resource of the system as a first candidate computing framework; and
instructions for selecting, in the first candidate computing framework, a first candidate computing framework whose predicted operation time is the shortest as the fixed target computing framework.

12. The apparatus of claim 10, wherein the programming instructions further comprise:
instructions for using each feature that is generated during execution of the sub-task in the fixed target computing framework of the sub-task as a new training sample after executing the corresponding sub-task based on the fixed target computing framework; and
instructions for adding the new training sample to the preset training sample set.

13. A non-transitory computer-readable storage medium comprising instructions which, when executed by a computer, cause the computer to:
- receive a task request that carries a task submitted by a user;
- generate a sub-task set comprising at least one sub-task according to the task in the task request;
- determine input data for executing each sub-task;
- perform the following operations for each sub-task in the sub-task set:
  - determine, in all computing frameworks configured in a system, computing frameworks that are capable of executing the sub-task as candidate computing frameworks, wherein a quantity of the candidate computing frameworks is greater than or equal to two;
  - separately predict, according to the input data of the sub-task and a prediction model that corresponds to each candidate computing framework, operation time and resource consumption that correspond to each candidate computing framework for executing the sub-task; and
  - select, in the candidate computing frameworks according to the operation time and the resource consumption that correspond to each candidate computing framework for executing the sub-task, a fixed target computing framework for executing the sub-task; and
- subsequent to selecting the fixed target computing framework, execute the corresponding sub-task based on the fixed target computing framework selected for executing each sub-task in the sub-task set.

14. The computer-readable storage medium of claim 13, wherein the task request further carries input data of the task, and wherein the instructions cause the computer to determine the input data for executing each sub-task by causing the computer to determine the input data for executing each sub-task according to the input data of the task carried in the task request.

15. The computer-readable storage medium of claim 13, wherein before receiving the task request, the instructions cause the computer to encapsulate, in all the computing frameworks configured in the system and using a preset programming language, application program interfaces (APIs) that are in all computing frameworks capable of executing a task having a same task type and that are capable of executing the task having the same task type to form a unified API, and wherein the instructions cause the computer to determine the computing frameworks that are capable of executing the sub-task as candidate computing frameworks by causing the computer to:
- determine a task type of the sub-task;
- determine a unified API corresponding to the task type of the sub-task;
- determine, according to the determined unified API, all computing frameworks capable of executing the sub-task of the task type; and
- use the determined computing frameworks as the candidate computing frameworks.

16. The computer-readable storage medium of claim 13, wherein the instructions cause the computer to obtain the prediction model corresponding to the candidate computing framework by causing the computer to:
- read a preset training sample set, wherein the preset training sample set is preset for a capability of the candidate computing framework for executing the sub-task; and
- train, using the operation time and the resource consumption as target features separately, features other than the operation time and the resource consumption in the preset training sample set to obtain the prediction model corresponding to the candidate computing framework.

17. The computer-readable storage medium of claim 16, wherein after executing the corresponding sub-task based on the fixed target computing framework for executing each sub-task in the sub-task set, the instructions further cause the computer to:
- use each feature generated during execution of the sub-task in the fixed target computing framework of the sub-task as a new training sample; and
- add the new training sample to the preset training sample set.

18. The computer-readable storage medium of claim 13, wherein the instructions cause the computer to select the fixed target computing framework by causing the computer to:
- select, in the candidate computing frameworks, a candidate computing framework whose predicted resource consumption is less than an available resource of the system as a first candidate computing framework; and
- select, in the first candidate computing framework, a first candidate computing framework whose predicted operation time is the shortest as the fixed target computing framework.

* * * * *